June 15, 1926.

C. N. CURRIER ET AL 1,588,530

MULTIPLE COOKING MACHINE

Filed April 13, 1925    4 Sheets-Sheet 1

Inventors:
Charles N. Currier,
Maurice C. Merrill,

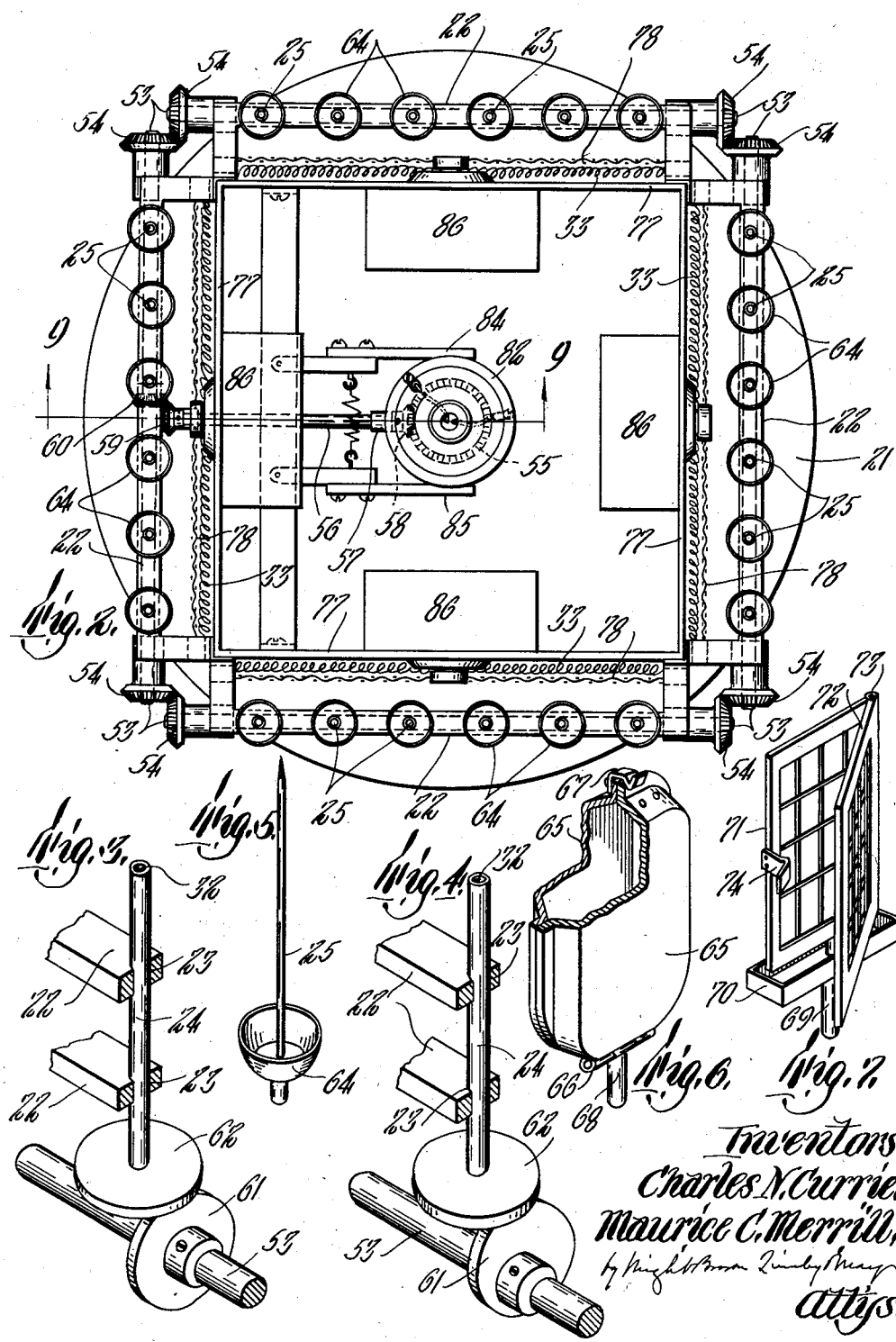

June 15, 1926.
C. N. CURRIER ET AL
1,588,530
MULTIPLE COOKING MACHINE
Filed April 13, 1925    4 Sheets-Sheet 3
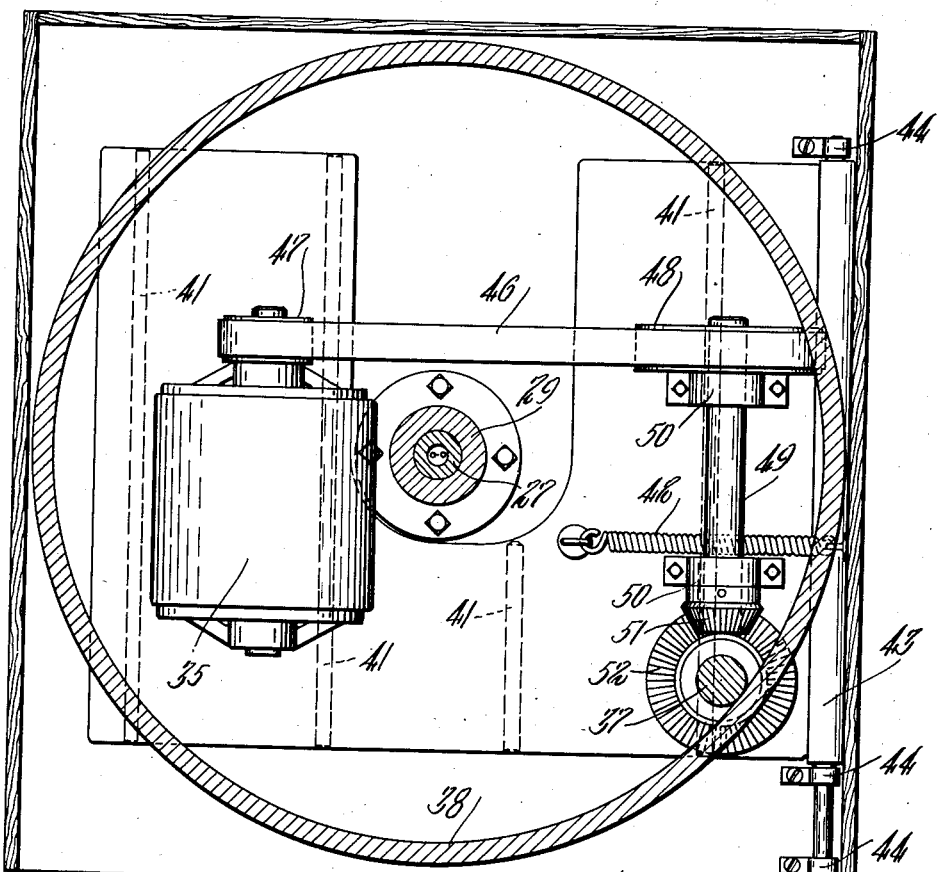
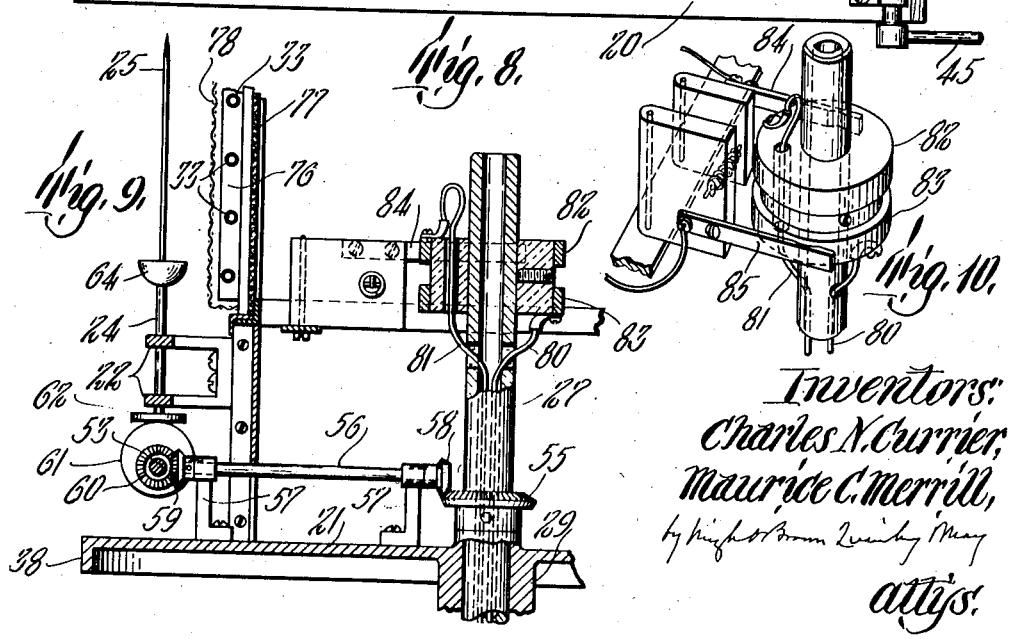
Inventors:
Charles N. Currier,
Maurice C. Merrill,
attys.

Patented June 15, 1926.

1,588,530

UNITED STATES PATENT OFFICE.

CHARLES N. CURRIER AND MAURICE C. MERRILL, OF SALEM, MASSACHUSETTS.

MULTIPLE COOKING MACHINE.

Application filed April 13, 1925. Serial No. 22,628.

The chief object of this invention is to provide a novel and attractive machine adapted to cook or toast articles of food, such as sausages, the machine being adapted to hold a considerable number of articles conspicuously displayed while they are being cooked, to rotate each article on a vertical axis and in operative proximity to heating means constituting an element of the machine, so that the articles will be uniformly cooked on all sides, and to revolve the machine and the assemblage of articles thereon, about a vertical axis during the cooking operation, to produce a spectacular effect.

Another object is to provide a machine adapted to operate as above stated, and to impart a vertical reciprocating motion to each article while it is being rotated about its axis, thus adding to the spectacular effect.

Other related objects will appear as the description proceeds.

Of the accompanying drawings forming a part of this specification—

Figure 2 is a top plan view of the same.

Figures 3 and 4 are perspective views, each showing one of the article-holding spindles hereinafter described, and elements of the means employed for rotating the spindle on its own axis, Figure 4 showing said elements organized to vertically reciprocate the spindle.

Figure 5 is a perspective view, showing the article-engaging terminal of the spindle, removed from the body or main portion of the spindle, said terminal being formed to impale a sausage.

Figures 6 and 7 are perspective views, showing modified forms of the spindle terminals, Figure 6 showing a terminal adapted to confine a portion of hamburg steak, and Figure 7, a terminal adapted to confine a slice of bacon.

Figure 8 is a section on line 8—8 of Figure 1, and a plan view of parts below said line.

Figure 9 is a section on line 9—9 of Figure 2.

Figure 10 is a perspective view, showing a portion of the fixed vertical stud hereinafter described, and current-conducting means associated therewith.

The same reference characters indicate the same parts in all of the figures.

Figure 1:
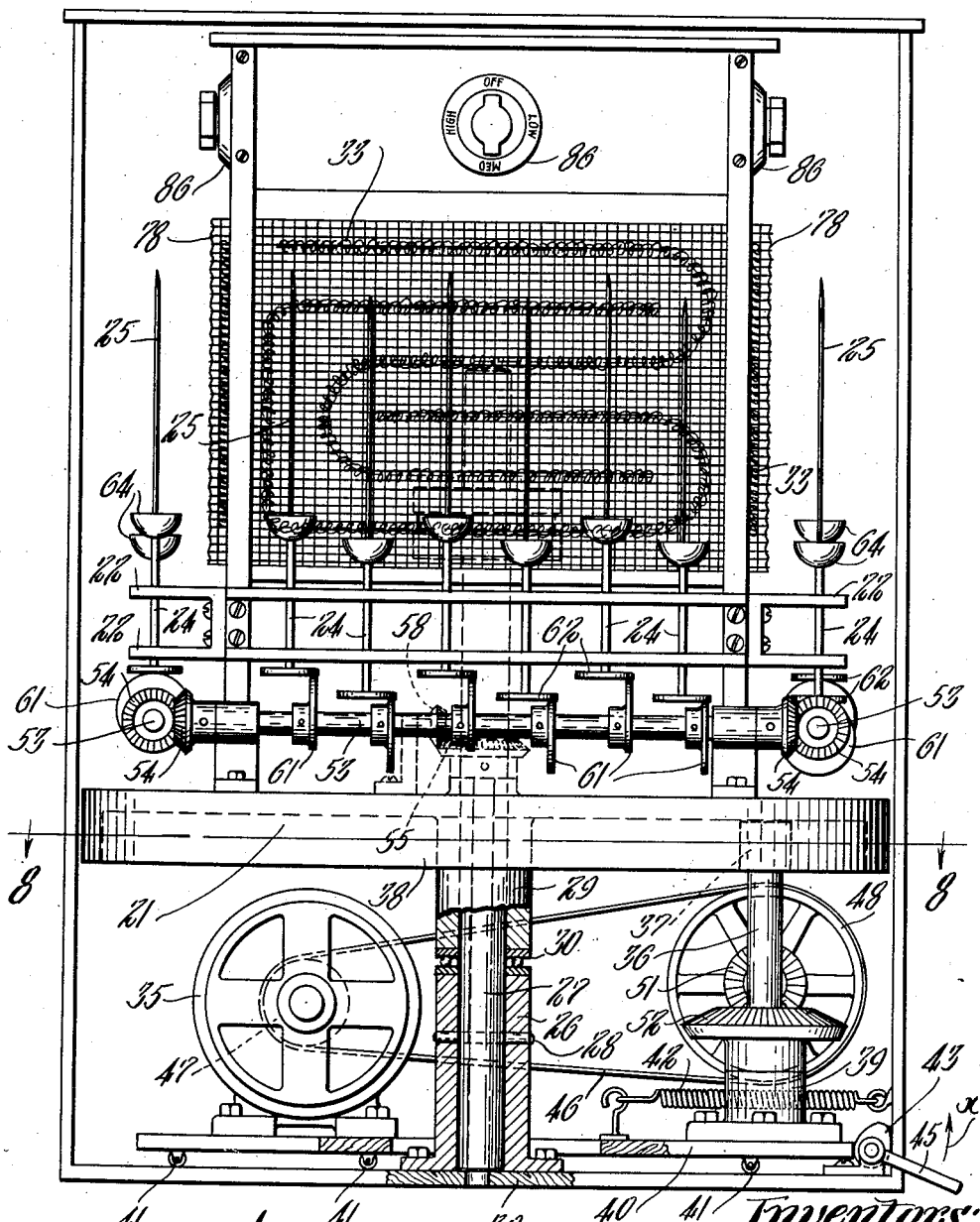
Figure 1 shows mainly in side elevation, and partly in vertical section, a multiple cooking machine embodying the invention.

The machine of our invention comprises a fixed supporting base, 20, and a carrying frame mounted to rotate on a vertical axis supported by the base. In the preferred embodiment of the machine here shown, the carrying frame includes a turntable 21, and a superstructure fixed to and projecting above the turntable, and including horizontal bars 22, having bearings 23 (Figures 3 and 4). In said bearings are journaled vertical spindles 24, which are provided with terminals 25 (Figure 5), on which articles to be cooked or toasted may be confined, the terminals being removably inserted in sockets 32 in the spindles.

The vertical axis of the carrying frame is preferably provided by a vertical socket 26, fixed and projecting above the base 20, a fixed vertical stud 27, secured as by a pin 28, in the socket and projecting above the latter, and through the turntable 21, and a hub 29, formed on the turntable and embracing a portion of the stud. An anti-frictional thrust bearing 30 is interposed between the socket 26 and the hub 29, and permits free rotation of the carrying frame on the stud.

The spindles 25 are arranged in hollow formation around the axis of the frame, the spindles preferably forming a hollow square, as shown by Figure 2.

We provide heating means carried by the frame within the group of spindles, said heating means being arranged to act simultaneously on the articles confined on the spindles. We prefer to embody the heating means in a plurality of electrical heating units 33, carried by the frame within the group of spindles and arranged in hollow formation, as shown by Figure 2, said units presenting four sides, which are uniformly spaced from the rows constituting the hollow group of spindles.

We provide operating mechanism for simultaneously moving the frame and the spindles and including frame-rotating means and spindle-rotating means, organized respectively to rotate the frame about its axis and to rotate the spindles about their several axes, so that the spindles have a planetary motion, the group of spindles revolving about the axis of the frame, and each spindle rotating about its own axis.

The frame-rotating means includes an electric motor 35, a vertical shaft 36, driven by the motor and provided with a friction pulley 37, and an annular friction flange 38, formed on the turntable 21, and in frictional engagement with the pulley, as shown by Figure 8. The shaft 36 is journaled in a bearing 39, fixed to a movable base 40, having rolls 41 bearing on the fixed base 20. The base 40 is movable by a spring 42, in the direction required to press the friction roll 37 against the turntable flange 38, and is movable in the opposite direction, against the stress of the spring 42, to disengage the friction roll from the flange, and thus stop the rotation of the frame. To cause the last-mentioned movement, we provide a cam bar 43 (Figures 1 and 8) journaled in bearings 44 on the fixed base 20, and provided with an operating handle 45. When said handle is moved in the direction of the arrow $x$ (Figure 1), the cam bar forces the movable base 40 to the left from the position shown by Figure 1, and thus separates the friction roll 37 from the flange 38. The motor 35 is mounted on the movable base, and its shaft is connected with the friction roll shaft 36, to rotate the latter, by a belt 46, running on a pulley 47, on the motor shaft, and on a pulley 48, on a shaft 49, journaled in bearings 50 on the movable base. The shaft 49 has a bevel gear 51, meshing with a bevel gear 52, on the friction roll shaft 36. Elements of the spindle-driving means are four horizontal shafts 53, arranged in hollow formation, corresponding to that of the spindles and connected end to end by bevel gears 54, a bevel gear 55, fixed to the stud 27, a horizontal shaft 56, journaled in bearings 57 on the turntable, and provided with a gear 58, meshing with the fixed gear 55 and with a gear 59 meshing with a gear 60, on one of the shafts 53.

The arrangement is such that when the frame is rotated about the fixed gear 55, the four interengaged horizontal shafts 53 are simultaneously rotated.

Other elements of the spindle-driving means are vertically arranged friction disks 61, fixed to the shafts 53, and horizontally arranged friction disks 62, fixed to the lower spindle sections 24, and in frictional engagement with the disks 61, the arrangement being such that the rotation of the horizontal shafts 53 and their disks 61, causes the rotation of the disks 62 and the spindles. The disks 61 are preferably eccentric to the shafts 53, so that their rotation not only rotates, but also vertically reciprocates the spindles,
the lower sections 24 of which are vertically movable in the bearings 23. The object of the vertical reciprocation is to increase the spectacular effect of the machine when it is in operation, the spindles having an up and down motion, in addition to the planetary motion above described.

The spindles are spaced from the heating units 33, so that articles confined thereon are in close proximity to the units, without contacting with the latter. The rotation of the spindles causes all sides of the articles to be uniformly cooked or toasted. The spindle terminals 25 may be removed from the sockets of the spindles, thrust into sausages and then replaced. Each terminal 25 has a drip cup 64, at its lower end portion, adapted to collect liquid flowing from an impaled sausage.

The machine may be adapted to cook other articles by providing differently formed spindle terminals. Figure 6 shows a terminal composed of two pan-shaped sections 65, connected by a hinge 66, and confined together by a catch 67. The terminal is provided with a shank 68, removably insertible in a spindle socket 32. A mass of hamburg steak may be confined and cooked between the sections 65.

Figure 7 shows a terminal adapted to hold a slice of bacon. This terminal includes a shank 69, a drip cup 70, and a grid 71, fixed to the shank, and a grid 72, hinged at 73 to the grid 71, and adapted to be confined against the latter by a catch 74.

The frame superstructure may be of any suitable construction adapting it to support the heating units 33 in the hollow formation, and in the location relative to the spindles shown by Figure 2. Said units are preferably looped, as shown by Figure 1, and inserted in orifices in frame bars 76 (Figure 9).

Inward radiation of heat from the heating units may be prevented by wall members 77 of asbestos board, or other suitable material. The heating units may be externally protected by sheets 78 of wire cloth, located between the outer sides of the heating units and the spindles.

Figure 11:
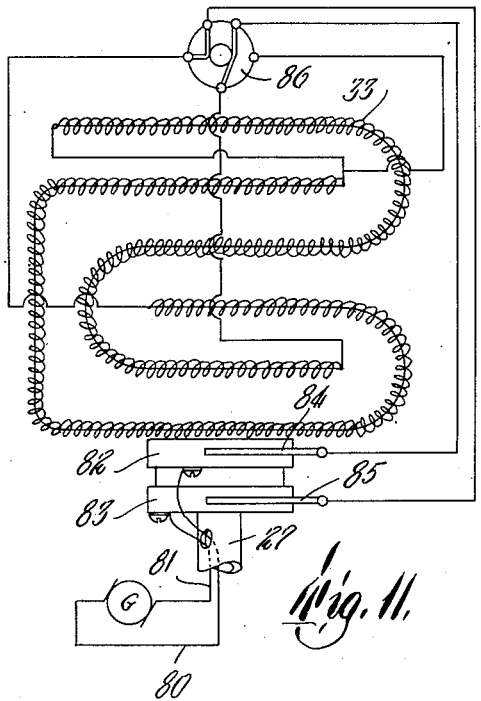
Figures 11, 12 and 13 are diagrammatic views, showing elements of electrical heating means, and heat-regulating means associated therewith.
Figure 12:
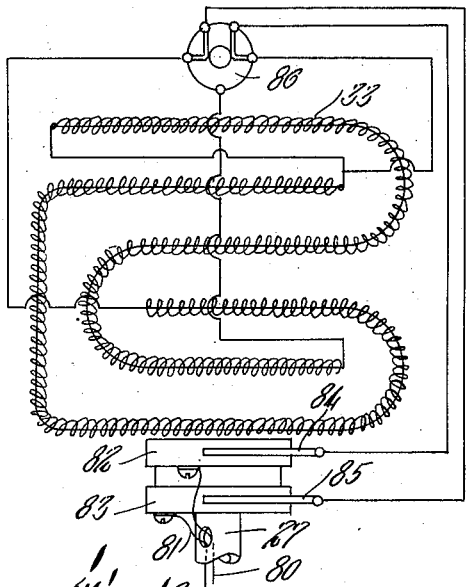
Figure 13:
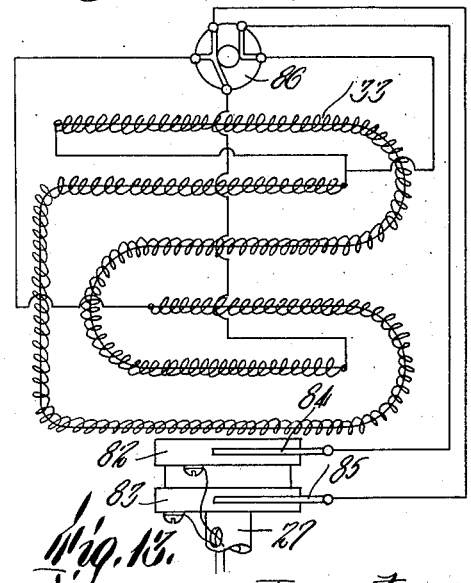

To supply current to the heating units we provide conducting wires 80, connected with a source of power G, as shown by Figure 11. The wire 80 is connected with an annular contact member or ring 82, and the wire 81 is connected with an annular contact member or ring 83. Said annular members are fixed to and insulated from the fixed stud 27. Spring contact members 84 and 85 secured to members of the rotary frame, as shown by Figure 10, contact respectively with the annular members 82 and 83, and are connected by circuit wires with the heating units, as indicated diagrammatically by Figures 11, 12 and 13. Switches 86 are included in the heating circuit and are adapted to be adjusted as shown by Figure 11, to cause a low heat, and as shown by Figure 12, to cause a medium heat, and as shown by Figure 13, to cause a high or maximum heat.

Figure 14:
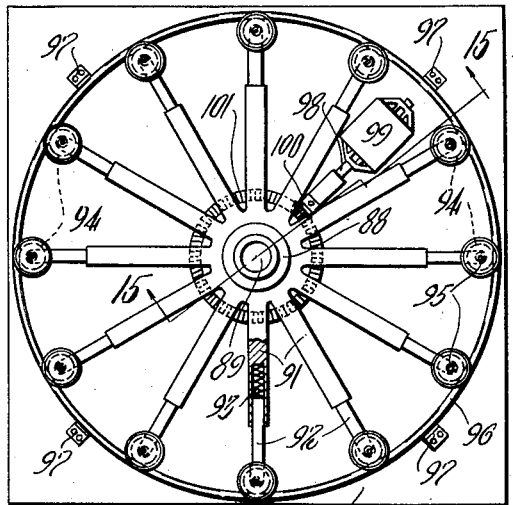
Figure 14 is a top plan view, showing a modification.
Figure 15:
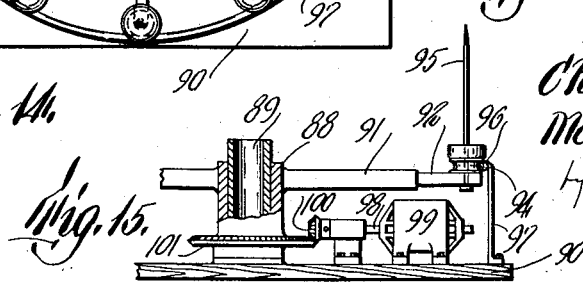
Figure 15 is a section on line 15—15 of Figure 14.

Figures 14 and 15 show a modification, in which the rotary frame includes a hub portion 88, rotatable in a horizontal plane, on a fixed stud 89, on a fixed base 90, tubular arms 91, radiating from the hub portion, slides 92 movable in the bores of the arms 91, and pressed outwardly therein by springs 93. On the outer ends of the slides 92 are grooved pulleys 94, to which are fixed vertical impaling spindles 95. The pulleys 94 are pressed by the springs 93 against a horizontal annular track 96, supported by standards 97, fixed to the base 90. The shaft 98 of a motor 99, fixed to the base, is connected with the hub portion 98, by a bevel gear 100, fixed to the motor shaft, and a bevel gear 101, fixed to the hub 88. The motor therefore rotates the frame and the annular track 96 in frictional contact with the spindle pulleys 94, causes the rotation of the spindles on their several axes, the spindles having a planetary motion as before. The heating element (not shown) will in this case, be annular and suitably spaced from the inner sides of the spindles.

We claim:—

1. A multiple cooking machine comprising a fixed supporting base, a carrying frame mounted to rotate on a vertical axis supported by the base, a group of vertical spindles, in bearings on the frame and arranged in hollow formation around the axis of the frame, each spindle having a terminal adapted to hold an article to be cooked, heating means carried by the frame within the group of spindles and arranged to act simultaneously on the articles confined on the spindle terminals and operating mechanism, including means for rotating the frame about its axis, and means for rotating the spindles about their several axes, the arrangement being such that each spindle is revolved about the axis of the frame, and rotated on its own axis, so that it has a planetary motion presenting different sides of the confined article to the heating means.

2. A multiple cooking machine comprising a fixed supporting base, a carrying frame mounted to rotate on a vertical axis supported by the base, a group of vertical spindles, in bearings on the frame and arranged in hollow formation around the axis of the frame, each spindle having a terminal adapted to hold an article to be cooked, heating means carried by the frame within the group of spindles and arranged to act simultaneously on the articles confined on the spindle terminals, operating mechanism, including means for rotating the frame about its axis, means for rotating the spindles about their several axes, and means for vertically reciprocating the spindles, the arrangement being such that each spindle is revolved about the axis of the frame, rotated on its own axis while revolving, and reciprocated vertically while revolving and rotating.

3. A multiple cooking machine comprising a fixed supporting base, a rotary supporting frame mounted to rotate on a vertical axis supported by the base, said frame including a turntable constituting the base portion of the frame, and having an annular friction flange concentric with the shaft, a group of vertical spindles journaled in bearings on the frame above the turntable and arranged in hollow formation around the axis of the frame, each spindle having a terminal adapted to hold an article to be cooked, heating means carried by the frame within the group of spindles, and arranged to act simultaneously on the articles confined on the spindle terminals, operating mechanism including a motor, a motor-driven shaft having a friction pulley engaged with the turntable flange to rotate the frame, a group of horizontal spindle-driving shafts journaled in bearings on the turntable and arranged in formation corresponding to that of the group of spindles, means operable by the rotation of the frame to rotate the shafts simultaneously, friction disks fixed to the shafts, and friction disks fixed to the spindles, and engaged with the friction disks on the shafts, to rotate the spindles in unison.

4. A multiple cooking machine as specified by claim 3, the friction disks on the spindle-driving shafts being eccentric to said shafts and adapted to reciprocate the spindles vertically while rotating the same.

5. A multiple cooking machine comprising a fixed supporting base, a rotary supporting frame mounted to rotate on a vertical axis supported by the base, said frame including a turntable constituting the base portion of the frame, and having an annular friction flange concentric with the shaft, a group of vertical spindles journaled in bearings on the frame above the turntable and arranged in hollow formation around the axis of the frame, each spindle having a terminal adapted to hold an article to be cooked, heating means carried by the frame within the group of spindles, and arranged to act simultaneously on the articles confined on the spindle terminals, a movable base supporting the motor and the motor-driven shaft, a spring exerting pressure on the movable base, to press the friction pulley against the friction flange, and thereby cause rotation of the frame, means for moving the movable base against the tension of the spring to disengage the friction pulley from the friction flange and stop the rotation of the frame, a group of horizontal spindle-driving shafts journaled in bearings on the turntable and arranged in formation corresponding to that of the group of spindles, means operable by the rotation of the frame to rotate said shafts simultaneously, friction disks fixed to the shafts, and friction disks fixed to the spindles and engaged with the friction disks on the shafts, to rotate the spindles in unison.

6. A multiple cooking machine comprising a fixed supporting base, a vertical socket fixed to and projecting upward from the base, a fixed vertical stud secured in and projecting above the socket, a carrying frame including a turntable having a hub embracing a portion of the stud, a thrust bearing interposed between the hub and the socket, said socket, stud and hub constituting a vertical axis on which the frame is rotatable in a horizontal plane, a group of vertical spindles journaled in bearings on the frame above the turntable and arranged in hollow formation, each spindle having a terminal adapted to hold an article to be cooked, heating means carried by the frame within the group of spindles and arranged to act simultaneously on articles confined on the spindles, and operating mechanism including frame-rotating means for rotating the frame about its axis, and spindle-rotating means for rotating the spindles about their several axes, said spindle-rotating means including a bevel gear fixed to the stud, a group of horizontal spindle-driving shafts journaled in bearings on the turntable and arranged in formation corresponding to that of the group of spindles, said shafts being connected end to end by bevel gears, so that they are simultaneously rotatable, and torque-transmitting connections between the fixed gear on the stud and one of the horizontal shafts, the arrangement being such that when the carrying frame is rotated about its axis, the spindles are simultaneously rotated about their several axes.

7. A multiple cooking machine comprising a fixed supporting base, a carrying frame mounted to rotate on a vertical axis supported by the base, a group of vertical spindles journaled in bearings on the frame, each spindle having a terminal adapted to hold an article to be cooked, a plurality of electrical heating units carried by the frame, within the group of spindles, and arranged in hollow formation, so that they are adapted to act simultaneously on the articles confined on the spindles, operating mechanism including frame rotating means for rotating the frame about its axis, and spindle-driving means for rotating the spindles about their several axes, said mechanism including a fixed vertical stud constituting an element of the frame axis and projecting into the space surrounded by the heating units, and current-conducting means including spaced apart annular contact members fixed to the stud within said space, spring contact members carried by the frame in circuit with the heating units and bearing on said annular members, and circuit wires connected with the annular contact members.

8. A multiple cooking machine comprising a fixed supporting base, a carrying frame mounted to rotate on a vertical axis supported by the base, a group of vertical spindles journaled in bearings on the frame and arranged in hollow formation around the axis of the frame, each spindle including a pointed terminal, removably inserted in a socket in the spindle and adapted to impale a sausage, the terminal being provided at its base portion with a drip cup adapted to catch liquid flowing from an impaled sausage, heating means carried by the frame within the group of spindles and arranged to act simultaneously on sausages impaled on the spindles, and operating mechanism including means for rotating the frame about its axis, and spindle-driving means for rotating the spindles about their several axes.

In testimony whereof we have affixed our signatures.

CHARLES N. CURRIER.
MAURICE C. MERRILL.